(12) United States Patent
Dreibholz et al.

(10) Patent No.: US 6,597,978 B1
(45) Date of Patent: Jul. 22, 2003

(54) METHOD FOR CONTROLLING AN AUTOMATIC TRANSMISSION

(75) Inventors: Ralf Dreibholz, Meckenbeuren (DE); Hans-Jörg Domian, Immenstaad (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/856,733

(22) PCT Filed: Dec. 1, 1999

(86) PCT No.: PCT/EP99/09338

§ 371 (c)(1), (2), (4) Date: May 24, 2001

(87) PCT Pub. No.: WO00/34692

PCT Pub. Date: Jun. 15, 2000

(51) Int. Cl.$^7$ .............................................. F16H 61/04
(52) U.S. Cl. ............................ 701/51; 701/64; 701/67; 307/19; 477/5; 477/15; 477/34; 475/121; 475/169; 475/200; 475/201; 475/256
(58) Field of Search ........................... 701/51, 55, 67, 701/54, 58, 64, 66; 477/50, 51, 117, 121, 5, 15, 34, 57, 70, 77, 86, 132, 161, 171; 307/19, 20; 475/121, 169, 200, 201, 204, 206, 256, 263

(56) References Cited

U.S. PATENT DOCUMENTS

| | | | |
|---|---|---|---|
| 4,890,515 A | 1/1990 | Taniguchi et al. | 74/866 |
| 5,033,328 A | 7/1991 | Shimanaka | 74/886 |
| 5,079,970 A | 1/1992 | Butts et al. | 74/858 |
| 5,795,265 A | 8/1998 | Domian et al. | 477/143 |
| 5,911,648 A * | 6/1999 | Dreibholz et al. | 477/154 |
| 5,947,863 A | 9/1999 | Grob et al. | 477/109 |
| 6,101,438 A * | 8/2000 | Staiger et al. | 701/55 |
| 6,366,843 B1 * | 4/2002 | Dreibholz et al. | 701/51 |

FOREIGN PATENT DOCUMENTS

| | | |
|---|---|---|
| DE | 44 24 456 A1 | 1/1986 |
| DE | 42 09 091 A2 | 9/1993 |
| DE | 198 04 630 A1 | 8/1998 |
| EP | 0 349 994 A1 | 1/1990 |
| EP | 0 849 110 A2 | 6/1998 |

OTHER PUBLICATIONS

Schwab, Manfred and Alfred Müller. "Der Motoreingriff—ein neues Element der elektronischen Getriebesteuerung", *Bosch Technische Berichte 7*, 1983, pp. 116–174.

* cited by examiner

Primary Examiner—Thomas G. Black
Assistant Examiner—Tuan C To
(74) Attorney, Agent, or Firm—David & Bujold, P.L.L.C.

(57) ABSTRACT

A method is proposed for controlling an automatic transmission driven by a prime mover in which a shift from a first transmission ratio to a second transmission ratio occurs in the form of a pull upshift or push downshift or a pull downshift or push upshift by a first clutch opening and a second clutch closing and an electronic transmission control device controls, via electromagnetic valves, the pressure curve of the first and of the second clutch during the shifting operation. The shifting operation is divided into various shifting phases, an engine intervention taking place in the load-transfer (LÜ) of the gradient-setting phase (GE), the sliding phase (GL), the gradient-reduction phase (GA) and the closing phase (S), an engine torque and/or a characteristic value that determines the engine torque being transferred from the transmission control device to an engine control device of the prime mover.

26 Claims, 3 Drawing Sheets

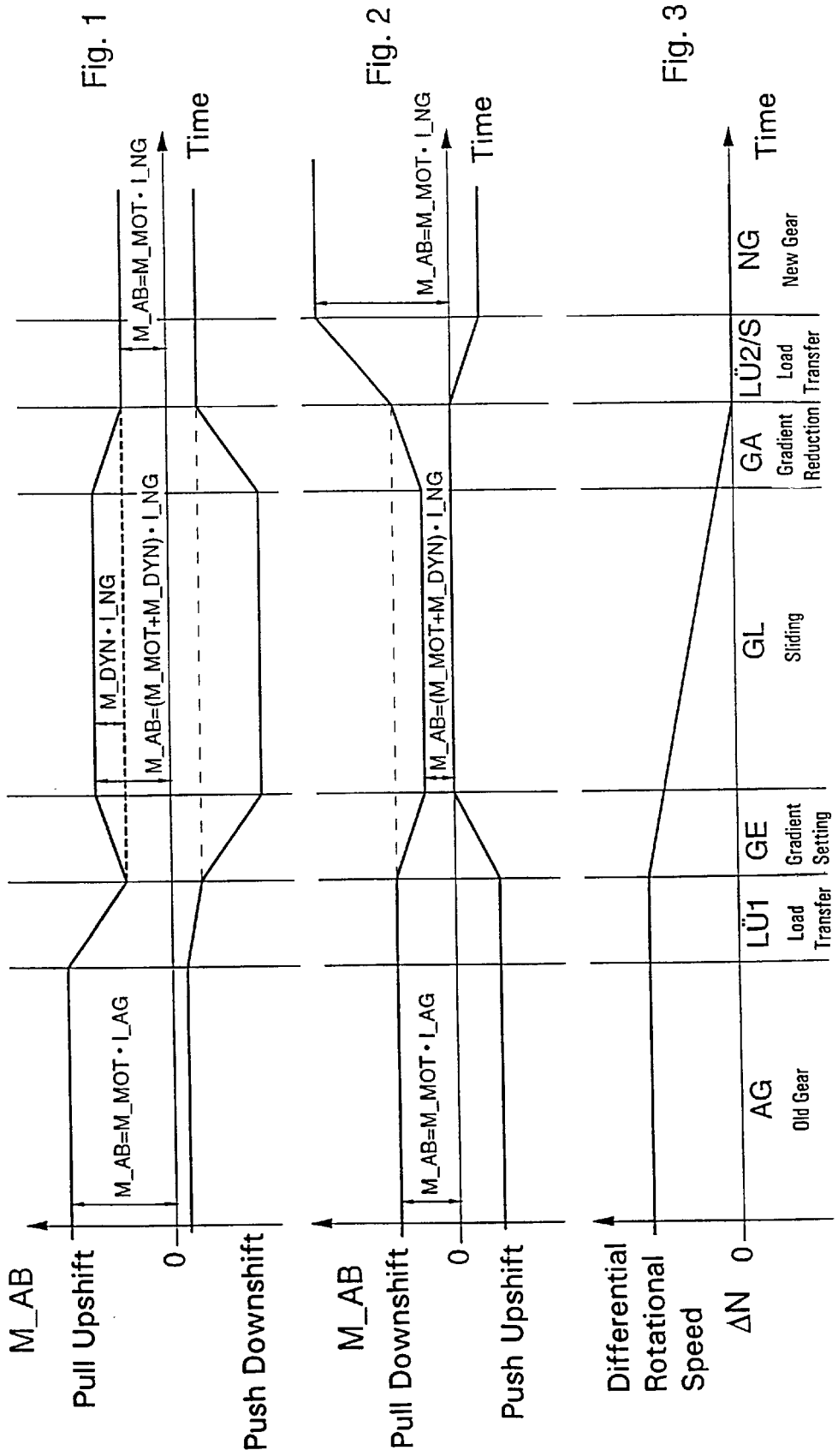

(·········· without Engine Intervention ·······with Engine Intervention)

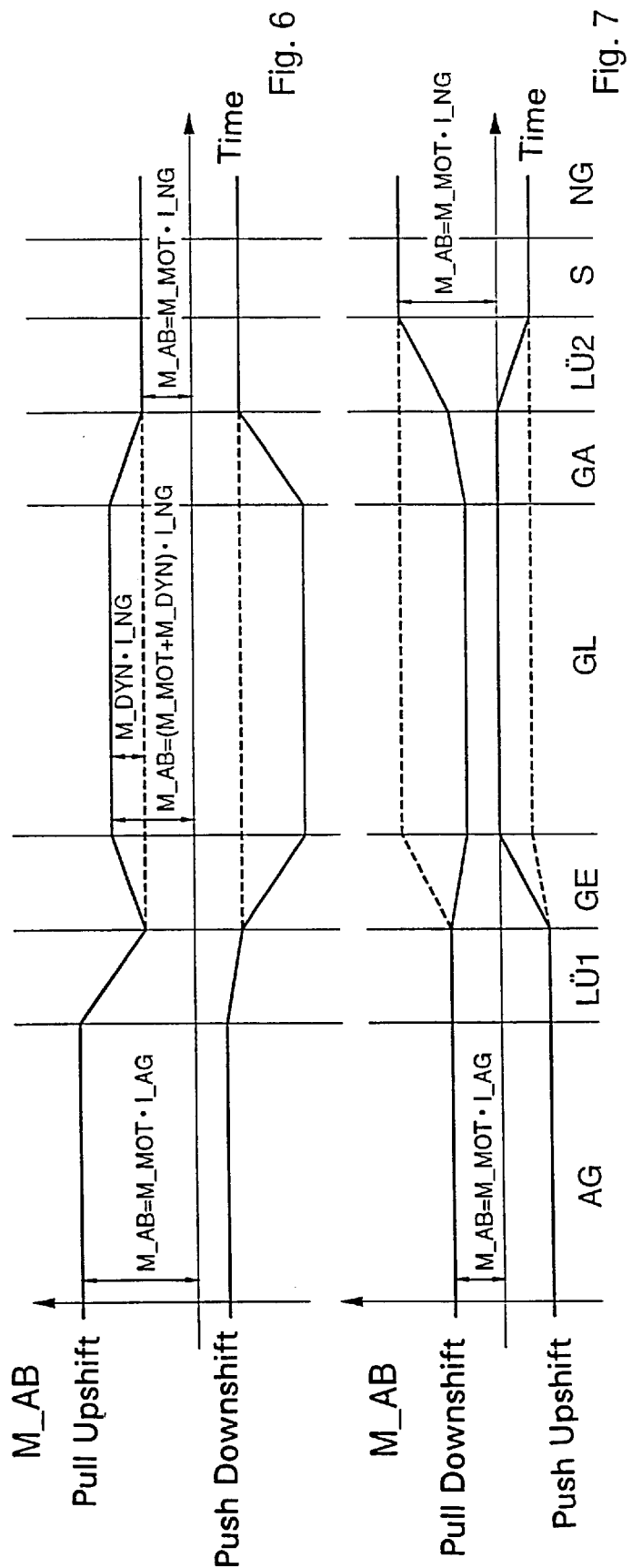

METHOD FOR CONTROLLING AN AUTOMATIC TRANSMISSION

The invention relates to a method for controlling an automatic transmission driven by a prime mover in which a shift from a first to a second transmission ratio occurs in the form of a pull upshift or a push downshift or as pull downshift or push upshift. A first clutch opens and a second one closes and an electronic transmission control device controls, via electromagnetic valves, the pressure curve of the first and second clutch during the shifting operation. The latter consists, in particular, of rapid-filling, filling-equalization, load-transfer, gradient-setting, sliding, gradient-reduction and closing phases.

Such a method is known already from the Applicant's laid open application DE 44 24 456 A1 which is included by explicit reference in the contents of the preamble of the instant patent application. In the publication is particularly proposed to use this method in a group transmission.

From the prior art ("The Engine Intervention"—a new element of the electronic transmission control by Manfred Schwab and Alfred Müller, Bosch, Technical Reports 7, 1983, pp. 166 to 174) is known, in general, to effect an engine intervention during a shifting operation, it being possible by an exactly timed controlled curve of the engine torque during shifting operations of an automatic transmission to optimize the control of the transmission with regard to shifting comfort, service life of the friction elements and the transmissible power of the transmission. By engine intervention is to be understood that all steps which, during a shifting operation in the transmission, allow purposefully to modulate, especially to reduce, the engine torque generated by the combustion process. Due to the legislator's strict requirement on the reaction time and the time cycle of the control during a total duration of the intervention of only about 500 ms, a precise timed coordination of the shifting operation is required. An engine intervention can be used both in upshifts and downshifts. The primary object of the engine intervention in upshifts is to reduce the energy loss produced in the friction elements during the shifting operation by reducing the engine torque during the synchronization process without interrupting the traction. The tolerance obtained thereby can be used to increase the service life of the friction partners by abbreviating the grinding time.

From DE 42 09 091 A1, a method is further known already for reducing the engine torque during a gear shift in a motor vehicle. The energy torque which results from rotating masses to be retarded or accelerated during a change of speed of the rotation angle of the engine determined by a gear change is calculated here and the engine torque is reduced during coupling of the new transmission gear by the amount of the energy torque.

Methods of the above mentioned kind are subject to constant further development with regard to an optimal use of the engine intervention with the smallest possible load of the shifting elements, an optimal torque curve that takes into account the directives of the engine manufacturer, especially in relation to the limits of the maximum possible engine intervention with regard to mixture and exhaust conditions, the same as to the use of possible advantages in the shifting quality as result of the torque modulation.

The problem to be solved by this invention is to indicate an optimized use of the engine intervention with the purpose of improving the shifting quality by an engine intervention, especially by adapting the output torque during the slipping phase to the output torque at the end of the shift.

According to the invention, this problem is solved in a method of the above mentioned kind by an engine intervention by reduction of the engine torque within the load-transfer, gradient setting, sliding, gradient-reduction and closing phases wherein an engine torque and/or characteristic value that determines the engine torque is transmitted from the transmission control device to an engine control device. Thereby excesses in the breaking in of the output torque in the partial load range can be advantageously presented in shifts of all kinds. The response behavior or the drive dynamics of the transmission is also improved especially during pull downshifts in the partial load range, the shifting element load is reduced and the shifting quality improved in pull upshifts.

In one development of the invention is proposed that the start of the engine intervention for synchronization with the shifting pressure build-up in the GE and GL phases be delayed by a time step when the reaction of the engine to the engine intervention is quicker than the reaction of the transmission to pressure directives. Thereby is advantageously obtained that the output torque be, not unnecessarily reduced.

In reversal of the above mentioned features, it is proposed that the start of the shifting pressure build-up for synchronization with the engine intervention in the GE and GL phases be delayed by a time step when the reaction of the engine to the engine intervention is slower than the reaction of the transmission to pressure directives. Thereby is advantageously obtained that unnecessary frictional loads on the shifting elements be prevented.

In a development of the invention, the dynamic engine torque M_DYN is increased during the gradient-setting phase GE from 0 to 100%, in the sliding phase GL, it remains at 100% and in the gradient-reduction phase GA that follows the dynamic engine torque M_DYN is again reduced from 100% to 0.

When there exist outside the engine other torque-modulating aggregates, such as an electromotor, a dynamo, a fan, an air-conditioning compressor, an additional brake, or others, the engine intervention is distributed among the aggregates so as thereby to enlarge the limited torque range of the internal combustion engine.

The expression engine torque in this case extends to the sum of torques of all aggregates engaged in the transmission input.

Other objects, features, advantages and possible utilizations of the invention result from the description that follows of embodiments (shown in detail in the figures). All described and/or graphically shown features by themselves or in any logical combinations constitute the object of the invention independently of their compilation in the claims and their references to preceding claims. With reference to the accompanying drawings in which:

FIGS. 1 and 2 are the theoretical curve of the output torque during pull upshifts and push downshifts or pull downshifts and push upshifts with full throttle and the position of the gas pedal at idling during constant dynamic torque M_DYN;

FIG. 3 is the theoretical curve of the differential rotational speed during the shifting curve according to FIGS. 1 and 2;

FIGS. 6 and 7 are the theoretical curve of the output torque similar to FIGS. 1 and 2, but for the position of the gas pedal at part load under the condition M_AB (GL)= M_AB (NG).

Figure 4:
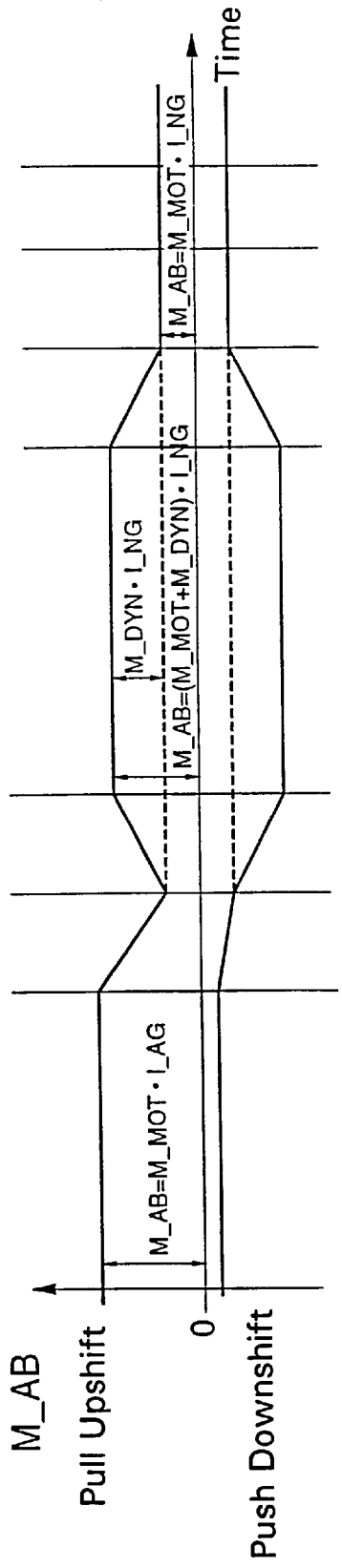
FIGS. 4 and 5 are the theoretical curve of the output torque similar to FIGS. 1 and 2, but for the position of the gas pedal at part load with compensation of the dynamic torque M_DYN.
Figure 5:
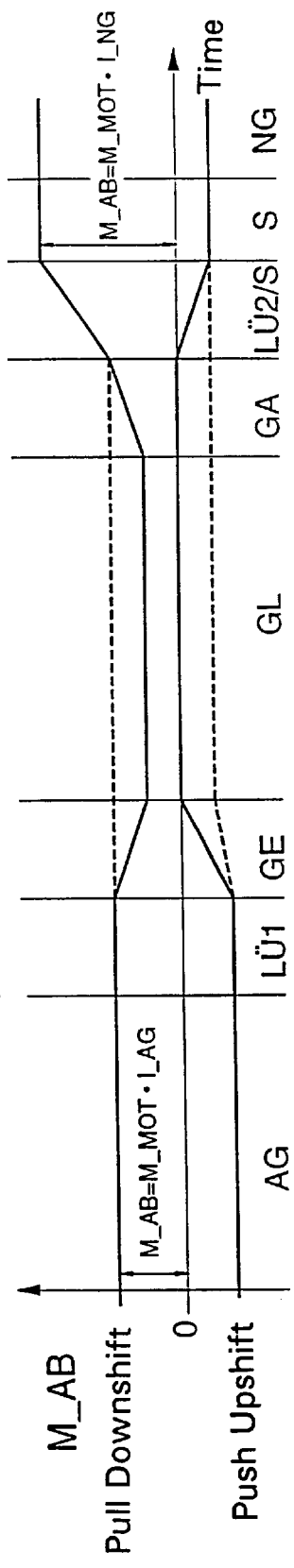

In FIGS. 1, 2 and 4 to 7 that follow is shown in each the theoretical curve of the output torque M_AB in the course of time, there being shown in separate figures, on one hand, the pull upshift and the push downshift (FIGS. 1, 4, 6) and, on the other, the pull downshift and the push upshift (FIGS. 2, 5, 7). The time intervals in all figures are essentially provided with the same abbreviations; these are AG for the phase of the old gear, LÜ for the load-transfer phase, LÜ1 being situated before the gradient-setting phase and LÜ2 after the gradient-reduction phase, GE for the gradient-setting phase, GL for the sliding phase, GA for the gradient-reduction phase and S for the closing phase, the same as NG for the phase of the new gear. In addition, the theoretical curve of the output torque M_AB without engine intervention is shown with a solid line and the theoretical curve of the output torque M_AB with engine intervention with a dotted line.

The output torque M_AB for full throttle and empty gas gear shifts (FIG. 1 and FIG. 2) constantly maintaining the dynamic torque M_DYN proceeds as follows:

In the AG phase (FIG. 1), where the old gear still is on, the output torque runs constantly according to the formula M_AB=M_MOT×I_AG. In the load-transfer phase LÜ1, the output torque is linearly reduced to a value M_AB=M_MOT×I_NG. In the gradient-setting phase GE, the output torque is linearly increased again by the value M_DYN×I_NG to the value M_AB=(M_MOT+M_DYN)×I_NG. In the gradient-reduction phase GA that follows a linear reduction occurs by the value M_DYN×I_NG to the value M_MOT×I_NG which is also kept constant in the phases LÜ2/S and NG. By the inventive engine intervention, a reduction of the output torque by the value M_DYN×I_NG occurs to the value of the output torque M_MOT×I_NG.

The lower curve (FIG. 1) of the output torque M_AB for a push downshift with empty gas without engine intervention makes possible only a curve with strong push torque excess; the dotted line shown in phases GE, GL and GA is to be understood as reference line.

For a pull downshift with full throttle or push upshift with empty gas (FIG. 2), the output torque M_AB remains constant until the beginning of the gradient setting phase GE. In the gradient-setting phase GE without engine intervention, the curve of the output torque M_AB is reduced, in the sliding phase GL, it is kept constant and in the gradient-reduction phase GA again linearly increased to the initial value, since in a pull downshift with full throttle an engine intervention is not possible. In the load-transfer/closing phase LÜ2 S, the output torque is increased to the value M_MOT×I_NG.

In a push upshift, as shown in FIG. 2, the output torque proceeds, at first, constant during the phases AG and LÜ1, in the phase GE, it increases linearly to the value 0 and remains there during the phases GL and GA and then drops back linearly to a value M_AB=M_MOT×I_NG in the load-transfer phase LÜ2 S, which it maintains during the NG phase of the new gear.

The differential rotational speed DELTA_N (FIG. 3) between start of the rotational speed change (phase GE) and the end of the rotational speed change (phase GA) proceeds, respectively, equally for all kinds of shifts shown in the invention and is, therefore, shown in FIG. 3 only by way of example. The differential rotational speed DELTA_N in the phases AG and LÜ1 proceeds constantly at first and then drops linearly during the phases GE, GL and GA to the value 0 which is maintained during the succeeding phases LÜ2 or S and NG.

The theoretical curves of the output torque M_AB for the position of the gas pedal at part load with compensation of the dynamic torque M_DYN (FIG. 4 and FIG. 5) proceeds as follows:

For the pull upshift and push downshift, according to FIG. 4, the two curves essentially correspond to the representations in FIG. 1, but with the substantial difference that in the GE, GL and GA phases an engine intervention during the push downshift is now possible and thereby, after the load-transfer phase LÜ1, a torque reduction to the value M_MOT×I_NG occurs and that value is maintained until reaching the phase NG of the new gear and during the phase NG.

Also during the pull downshifts or push upshifts during the position of the gas pedal at part load (FIG. 5), an engine intervention is now possible so that a break in of the output torque in the phases GE, GL and GA due to an increase of the output torque M_AB is prevented or a holding of the output torque M_AB in the value of the phases AG and LÜ1 is obtained. For the push upshift during the position of the gas pedal at part load with compensation of the dynamic torque M_DYN (FIG. 5), the strong torque break in by an engine intervention can be similarly prevented so that the output torque in the gradient-setting phase GE undergoes a slight reduction to the value M_MOT×I_NG.

The curve of the output torque M_AB for the pull upshift or push downshift during the position of the gas pedal at part load with the condition that the output torque during the sliding phase M_AB (GL) be equal to the output torque of the new gear M_AB (NG), proceeds essentially similarly to the curve for pull upshift and push downshift during the position of the gas pedal at part load with compensation of the dynamic torque according to FIG. 4.

The theoretical curve of the output torque M_AB for pull downshift or push upshift for the position of the gas pedal at part load with the condition that the output torque in the sliding phase M_AB (NG) be the same as the output torque in the phase of the new gear is shown in. FIG. 7. It is to be understood here that the curve in the phases AG and LÜ1 remains constant and in the phase GE, due to an intervention, linearly increases to a value M_MOT×I_NG and the latter is maintained during the sliding phase GL, the same as during the gradient-reduction phase GA, the load-transfer phase LÜ and the closing phase S until reaching the new gear NG.

The curve of the output torque M_AB for the push upshift with partial gas with the previously mentioned conditions M_AB (GL)=M_AB (NG) is essentially equal to the curve for a push upshift according to FIG. 5.

Summarizing, it can thus be concluded that, according to the invention, the following strategies are possible for an engine intervention wherein the output torque M_AB in the sliding phase GL can be modulated as follows:

a) a compensation occurs of the dynamic excess or reduction of the output torque wherein M_Soll MAX ME=M_MOT–M_DYN, b) the output torque M_AB in the sliding phase GL is equal to the output torque M_AB at the gear shift and NG where to the pull upshift, push downshift applies: M_MOT ME=M_MOT and to the pull downshift, push upshift applies:
M_SOLL MAX ME=M_MOT×(I_NG/I_AG)–M_DYN, c) in the course of time a linear change takes place of the output torque M_AB to the output torque at the shift and M_MOT×I_NG (middle course between a) and b)).

In all cases the desired engine theoretical torque is to be compared with the maximum adjustable engine torque, specifically during upshifts with M_MOT MIN ME (push curve of the engine) and during downshifts with M_MOT MAX ME (full load curve), theoretical values M_SOLL MAX ME which are each outside the setting range are to be limited to the maximum values.

What is claimed is:

1. A method for controlling an automatic transmission driven by a prime mover in which a shift from a first to a second transmission ratio occurs as one of a pull upshift, a push downshift, a pull downshift and a push upshift by a first clutch opening and a second clutch closing and an electronic transmission control device controls, via electromagnetic values, the pressure curve of the first and of the second clutch during the shift operation and the shift consists of a rapid-filling (SE), a filling-equalization (FA), a load-transfer (LÜ), a gradient setting (GE), a sliding (GL), a gradient-reduction (GA) and a closing (S) phase and that within the load-transfer (LÜ), a gradient-setting (GE), the sliding (GL), the gradient-reduction (GA) and the closing (S) phases an engine intervention occurs wherein at least one of an engine torque (M_MOT) and a characteristic value that determines the engine torque is transmitted form a transmission control device to an engine control device of the prime mover, and wherein the directive of the engine intervention to the engine and the pressure directives to the transmission are jointly synchronized when they have different time characteristics.

2. The method according to claim 1, wherein the directive of the engine intervention on the engine is delayed over a time step in the phases (GE) and (GL) when the reaction characteristic of the engine to the pressure directives is quicker than that of the transmission.

3. The method according to claim 1, wherein the pressure directives on the transmission are delayed over a time step in the phases (GE) and (GL) when the reaction characteristic of the engine to the directive of the engine intervention is slower than that of the engine.

4. A method for controlling an automatic transmission driven by a prime mover in which a shift from a first to a second transmission ratio occurs as one of a pull upshift, a push downshift, a pull downshift and a push upshift by a first clutch opening and a second clutch closing and an electronic transmission control device controls, via electromagnetic values, the pressure curve of the first and of the second clutch during the shift operation and the shift consists of a rapid-filling (SE), a filling-equalization (FA), a load-transfer (LÜ), a gradient setting (GE), a sliding (GL), a gradient-reduction (GA) and a closing (S) phase and that within the load-transfer (LÜ), a gradient-setting (GE), the sliding (GL), the gradient-reduction (GA) and the closing (S) phases an engine intervention occurs wherein at least one of an engine torque (M_MOT) and a characteristic value that determines the engine torque is transmitted form a transmission control device to an engine control device of the prime mover, and wherein the directive of the engine intervention to the engine and the pressure directives to the transmission are jointly synchronized when they have different time characteristics, and wherein the engine intervention occurs by directive of an engine theoretical torque (M_SOLL) by the transmission control device.

5. The method according to claim 4, wherein the directive of the engine intervention on the engine is delayed over a time step in the phases (GE) and (GL) when the reaction characteristic of the engine to the pressure directives is quicker than that of the transmission.

6. The method according to claim 4, wherein the pressure directives on the transmission are delayed over a time step in the phases (GE) and (GL) when the reaction characteristic of the engine to the directive of the engine intervention is slower than that of the engine.

7. The method according to claim 4, wherein the engine intervention occurs by directive of a sign-provided additional torque through the transmission control device.

8. The method according to claim 4, wherein the engine intervention occurs by directive of a characteristic value through the transmission control device which indicates the ratio of the engine theoretical torque with engine intervention (M_SOLL ME) to a reference basis.

9. The method according to claim 4, wherein actual torque (M_STAT) is calculated according to an engine theoretical torque with engine intervention (M_SOLL ME).

10. The method according to claim 4, wherein during downshifts a sign provided engine theoretical torque with engine intervention (M_SOLL MAX ME) is calculated according to a maximum sign-provided dynamic torque (M_DYN), to the engine torque without engine intervention (M_MOT) and to a maximum possible engine torque with engine intervention.

11. The method according to claim 4, wherein during upshifts a sign provided engine theoretical torque with engine intervention (M_SOLL MAX ME) is calculated according to a maximum sign-provided dynamic torque (M_DYN), to the engine torque without engine intervention (M_MOT) and to a minimum possible engine torque with engine intervention (M_MOT MIN ME).

12. The method according to claim 10, wherein the maximum engine theoretical torque with engine intervention (M_SOLL MAX ME) is calculated as sum of (M_MOT) minus (M_DYN).

13. The method according to claim 10, wherein the maximum engine theoretical torque with engine intervention (M_SOLL MAX ME) is calculated as sum of (M_MOT) multiplied by the ratio new gear (I_NG) by the ratio old gear (I_AG) minus (M_DYN).

14. The method according to claim 12, wherein the maximum engine theoretical torque with engine intervention (M_SOLL MAX ME) is changed from the value according to claim 8 to the value of claim 9 in the phases (GE, GL, GA, LÜ, S).

15. The method according to claim 8, wherein in the phase (GE) the engine theoretical torque with engine intervention (M_SOLL ME) changes from the value of the engine torque without engine intervention (M_MOT) to the value of the maximum engine theoretical torque with engine intervention (M_SOLL MAX ME) in upshifts.

16. The method according to claim 9, wherein in the phase (GE) the engine theoretical torque with engine intervention (M_SOLL ME) changes from the value of the engine torque without engine intervention (M_MOT) to the value of the maximum engine theoretical torque with engine intervention (M_SOLL MAX ME) in upshifts.

17. The method according to claim 4, wherein during pull downshifts and push upshifts in the phases (GA, LÜ2 and S), the engine theoretical torque with engine intervention (M_SOLL ME) changes from the value of the maximum engine theoretical torque with engine intervention (M_SOLL MAX ME) to the value of the engine torque without engine intervention (M_MOT).

18. The method according to claim 4, wherein during pull upshifts and push downshift in the phases (GA, LÜ2 and S), the engine theoretical torque with engine intervention (M_SOLL ME) changes from the value of the maximum engine theoretical torque with engine intervention (M_SOLL MAX ME) to the value of the engine torque without engine intervention (M_MOT).

19. The method according to claim 4, wherein the clutch pressure (P_K) on the closing clutch is calculated from the static engine torque with engine intervention (M_STAT ME), the dynamic engine torque (M_DYN), a factor (F1), a converter reinforcement (WV) and the absolute pressure (P_ABS).

20. The method according to claim 4, wherein the dynamic engine torque (M_DYN)during the gradient-setting phase (GE) is increased from zero to 100% in the sliding phase (GL), remains at 100%, and in the gradient-reduction phase (GA) is reduced from 100% to zero.

21. The method according to claim 4, wherein the maximum (M_MOT MAX ME) and minimum (M_MOT MIN ME) possible engine torque with engine intervention is actually reported back from the engine control device to the transmission control device.

22. The method according to claim 4, wherein the maximum (M_MOT MAX ME) and the minimum (M_MOT MIN ME) possible engine torque with engine intervention are stored in characteristic fields in the transmission control device according to operating parameters such as engine rotational speed, load position, or injection amount or engine torque, or air mass.

23. The method according to claim 4, wherein the engine intervention is activated according to operating parameters such as engine rotational speed, load position, or injection amount or engine torque or air mass.

24. The method according to claim 4, wherein when other torque-modulating aggregates (for ex., electromotor, dynamo, fan, air conditioning compressor, additional brake) exist, the engine intervention is distributed among said aggregates.

25. A method for controlling an automatic transmission driven by a prime mover in which a shift from a first to a second transmission ratio occurs as one of a pull upshift, a push downshift, a pull downshift and a push upshift by a first clutch opening and a second clutch closing and an electronic transmission control device controls, via electromagnetic values, the pressure curve of the first and of the second clutch during the shift operation and the shift consists of a rapid-filling (SE), a filling-equalization (FA), a load-transfer (LÜ), a gradient setting (GE), a sliding (GL), a gradient-reduction (GA) and a closing (S) phase and that within the load-transfer (LÜ), a gradient-setting (GE), the sliding (GL), the gradient-reduction (GA) and the closing (S) phases an engine intervention occurs wherein at least one of an engine torque (M_MOT) and a characteristic value that determines the engine torque is transmitted form a transmission control device to an engine control device of the prime mover, and wherein the directive of the engine intervention to the engine and the pressure directives to the transmission are jointly synchronized when they have different time characteristics, and wherein the clutch pressure (P_K) at the start of the engine intervention, namely, at the start of the phase (GE), is calculated as the sum of the absolute pressure (P_ABS) and the static engine pressure (P_M_STAT), the latter being calculated as product from the factor (F1) by the static engine torque (M_STAT) by the converter reinforcement (WV).

26. The method according to claim 25, wherein the clutch pressure (P_K) during the sliding phase (GL) is calculated as the sum of the absolute pressure (P_ABS) and the pressure (P_M STATE ME) of the static engine torque with engine intervention and the pressure (P_M DYN) of the dynamic engine torque (P_M DYN) being calculated as product from the factor (F1) by the converter reinforcement (WV) by the dynamic engine torque (M_DYN).

\* \* \* \* \*